Patented June 22, 1948

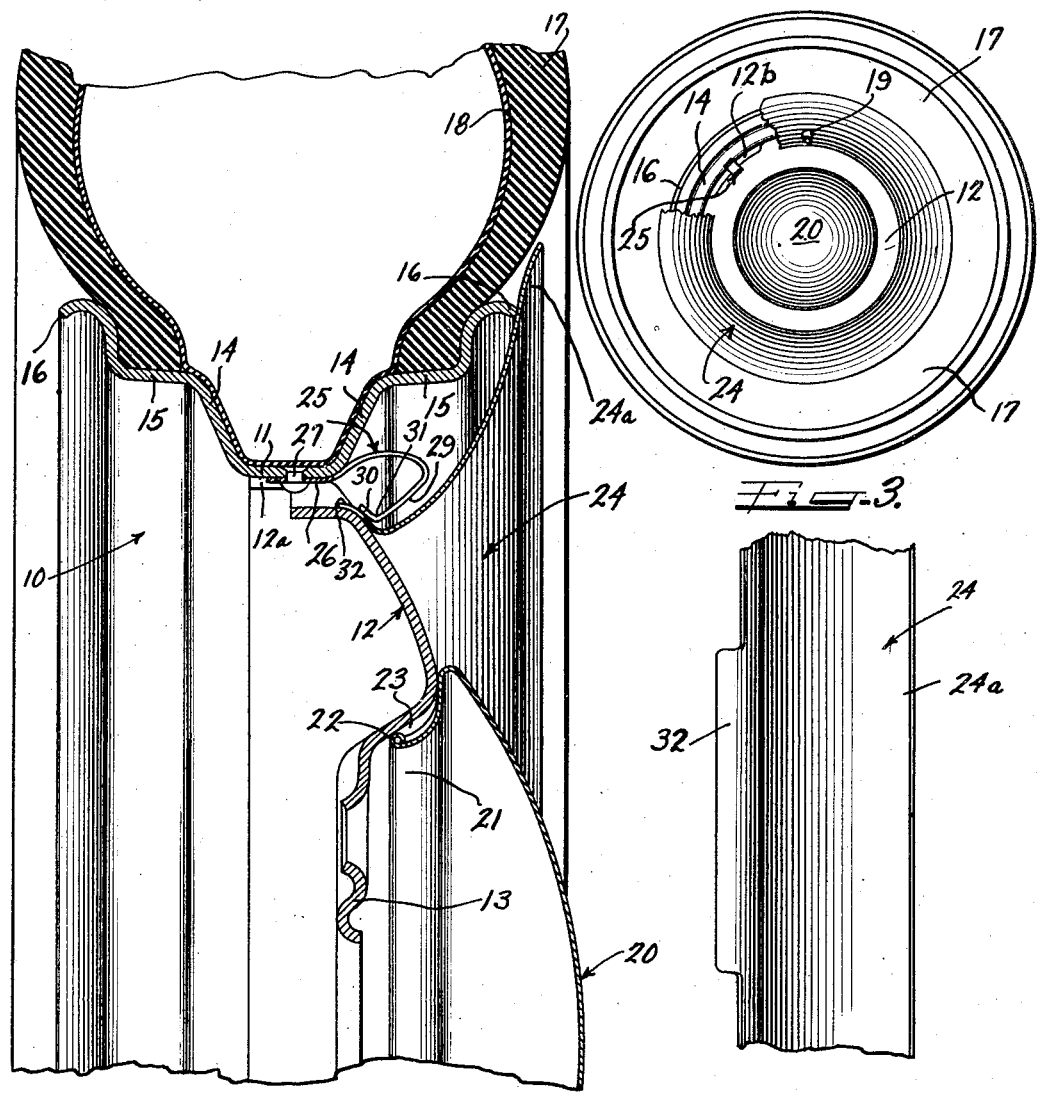

2,443,625

UNITED STATES PATENT OFFICE 2,443,625

WHEEL COVER

George Albert Lyon, Allenhurst, N. J.

Application September 6, 1943, Serial No. 501,349

5 Claims. (Cl. 301—37)

This invention is directed to an improved wheel structure and relates more particularly to an improved cover assembly therefor.

It is an object of the present invention to provide for a cover assembly adapted for disposition over the outer side of a wheel structure, improved retaining means for detachably securing the same to the wheel.

It is another object of the invention to provide an improved cover adapted for disposition over the outer side of a wheel structure having novel means whereby the cover cooperates both with the wheel structure and with retaining means thereon for disposition securely, yet detachably, on the wheel in correct concentric alignment therewith.

It is a further object of the invention to provide for a wheel structure having a tire rim and a central load bearing portion, there being circumferentially spaced circularly disposed apertures along the junction between the tire rim and the body part, an improved cover annulus having integral members extending generally axially inwardly from the radially inner edge thereof for co-engagement in the respective apertures to align the cover on the wheel structure, there being resilient retaining members on the wheel structure for resiliently engaging the radially inner portion of the cover and said axially inwardly extending members for detachably retaining the cover on the wheel.

In accordance with the general features of the invention, there is provided herein a wheel structure of the character having a tire rim of the drop center type and a central load bearing portion secured thereto, there being circumferentially spaced apertures along the junction of the tire rim and the load bearing part and resilient spring clips of the gooseneck type secured to the wheel structure, these spring clips being circularly arranged and circumferentially spaced for alignment with the respective apertures and having a part extending thereinto which is secured to the wheel structure, and a cover assembly including a radially outer annular portion formed from synthetic plastic sheet material or the like and having characteristics enabling it to be flexed locally, resiliently, whereby it will immediately snap back into its initial position upon release of flexing pressures therefrom, said cover portion having a plurality of integral, generally axially inwardly extending flanges at the radially inner part thereof, said flanges being arranged to extend into the respective apertures to bear radially against one of the wheel parts for alignment of the cover both radially and circumferentially, said resilient spring clip members being arranged to engage the radially inner marginal portion of said cover part to retain the same detachably upon the wheel structure.

It is a further object of the invention to provide for a wheel structure, a cover assembly having a radially outer annular portion formed from synthetic plastic sheet material or the like, said cover portion having a radially outer part flared axially outwardly and extending radially outwardly beyond the radially outer extremity of the tire rim to conceal the junction between the same and the tire therein, and further having an intermediate portion extending radially over the outer side of the tire rim and over the junction between the same and the central load bearing portion, said intermediate section being formed of a cross-sectional curvature whereby it substantially simulates the curvature of the respective side wall of the tire to give the appearance of being a part thereof and to appear as a continuation thereof and further to appear as a white side wall of a massive tire mounted on a wheel structure of minimum dimensions when colored white, said cover having integral portions arranged to interlock with the wheel structure to retain the same against movement, both radial and circumferential, with respect to the wheel.

Other objects and advantages of the invention will become apparent from the following description and accompanying drawings in which:

Figure 1 is a side elevational view of a wheel structure embodying my invention, parts being broken away for illustrative purposes;

Figure 2 is a fragmentary radial cross-sectional view of a wheel structure such as that shown in Figure 1; and Figure 3 is a fragmentary elevational view of my novel cover member looking radially inwardly from the outside thereof.

It will be understood that the modification shown herein is for illustrative purposes only and may be changed or modified without departing from the spirit and scope of the invention as set forth in the appended claims.

The wheel structure disclosed herein includes a tire rim part 10 and a central load bearing part 12, the tire rim part 10 being of the drop center type and having a base flange 11 to which a peripheral, axially inwardly extending skirt 12a of the body part 12 may be welded or riveted to provide a unitary wheel structure. As will be seen from Figures 1 and 2, the flange 12a may be depressed radially inwardly at circumferentially spaced portions to provide circumferentially spaced wheel openings 12b along the junction between the tire rim and the central load bearing part. The central load bearing part is further provided at the radially inner portion with a bolt-on flange 13 by means of which the wheel structure may be secured to an appropriate portion of the vehicle such as the brake drum or the like.

The tire rim 10 is further provided with opposite side wall flanges 14, opposite intermediate flanges 15 and opposite edge portions 16 between which may be disposed the radially inner parts of a tire 17 having an inner tube 18. The inner tube 18 may be provided with a valve stem 19 which extends generally axially outwardly through the adjacent side wall flange 14 of the tire rim and through a suitable aperture formed at the cover as shown in Figure 1.

If desired, the central portion of the outer side of the wheel may be covered by a hub cap simulating cover member 20 having a radially inwardly disposed, generally axially extending snap-on flange 21 terminating in a circular snap-on bead 22. It is desirable that this cover member be removably mounted upon the wheel structure and to this end, the adjacent portion of the outer surface of the central load bearing part 12 is provided with a plurality of circumferentially spaced, circularly disposed humps 23, having radially inwardly extending peaks which define a circle having a greater diameter than that defined by the radially outer extremity of the resilient circular bead 22 of the cover member 20. In applying the cover member 20 to the wheel structure it will be seen that it is merely necessary for the operator to align the bead 22 with the humps 23 so that it bears against the axially outer surfaces thereof, whereupon the cover may be pressed inwardly, this inward movement causing distortion of the bead 22 from its circular shape to an out of round shape until the bead slides over the peaks of the humps and rests against the axially inwardly facing surface thereof as shown in Figure 2, whereupon the bead 22 returns to its circular condition to retain the cover member in assembled relationship with the wheel structure so that the radially outer extremity thereof bears against the adjacent portion at the outer surface of the wheel structure.

The cover assembly is completed by the provision of a radially outer annular cover member 24 which is preferably constructed from sheet synthetic plastic material or the like and has physical characteristics enabling it to be flexed temporarily locally and yet whereby it immediately snaps back to its initial configuration upon release of flexing pressures therefrom. As will be seen from Figure 2, the annular cover member 24 is provided with a radially outer portion 24a which extends radially outwardly beyond the edge portion 16 to conceal the junction between the same and the tire 17 and is flared slightly outwardly in order to present to the side wall of the tire a smooth riding surface whereby the tire side wall is protected from cutting and abrasion upon lateral expansion thereof against the cover member 24 during operation of the vehicle under load bearing conditions. The annular cover member 24 is further provided with an intermediate portion which extends radially inwardly over the outer side of the wheel structure to a point on the outer surface of the central load bearing part 12 and thus beyond the junction of that part and the tire rim 10. This intermediate portion of the cover 24 is provided with a cross-sectional configuration of such shape that it substantially simulates the contour of the outer side of the respective side wall of the tire 17, thereby to give the appearance of being a continuation thereof and to appear as a part thereof and furthermore to appear as a white side wall of a massive tire mounted upon a wheel structure of minimum dimensions when it is colored white.

To the end that the annular cover member 24 may be securely detachably engaged on the wheel structure, there is provided herein a plurality of spring clip members having a gooseneck configuration, these members being indicated at 25. Each of the clip members 25 is provided with an inwardly extending shank 26 which is disposed in surface abutment with the radially inner surface of the adjacent portion of the base flange 11 and is secured thereto by welding or riveting as shown at 27. Each of the spring clips 25 is further provided with a generally, axially extending gooseneck portion 28, which is turned back to provide an arm 29 terminating in finger members 30, the arm extending generally radially and axially inwardly for oblique disposal and the fingers 30 extending generally axially inwardly, radially outwardly, for opposite oblique disposition, there being a peak 31 formed between the portions 29 and 30.

The cover member 24 is provided at the radially inner part thereof, as best shown in Figures 2 and 3 with generally axially inwardly extending lip members 32 which are so spaced and are of such length that they may be aligned with, for interlocking co-engagement in, the respective wheel openings 12b. As best shown in Figure 2, when the cover 24 is disposed upon the wheel structure the lips 32 extend into the wheel openings and lie in surface abutment with a portion of the radially outer surface of the depressed parts of the flange 12a of the wheel body part 12, thus maintaining the cover in concentric alignment with the wheel and against radial and circumferential shifting thereof relative to the wheel. This position of the cover is maintained by the resilient spring clips 25, the terminal fingers 30 of which bear against the adjacent portion of the cover 24 and hold the same resiliently against the wheel structure.

In applying the cover member 24 to the wheel it is merely necessary to flex the lips 32 radially inwardly a slight degree so that they pass radially inwardly of each of the spring clips 25, whereupon axially inward movement of the entire cover member disposes the lips 32 in the position shown in Figure 2 with the terminal fingers 30 of the spring clips bearing resiliently against the adjacent portion of the cover to hold the same against the surface of the body part 12.

In removing the cover member 24 from the wheel structure it will be seen that it is merely necessary for the operator to grasp the projecting flange 24a at the radially outer part of the cover with the fingers and to exert an axially outward pull thereon, whereupon the spring clip members 25 are flexed radially outwardly and the lip members 32 flex slightly radially inwardly to afford passage of the lips 32 axially outwardly beyond the clip members. Furthermore, it will be seen that when the assembly is arranged as shown in Figure 2, the radially inner part of the synthetic plastic cover member 24 extends between the metallic clips 25 and the outer surface of the metallic body part 12, thereby to cushion these parts against development of vibration and rattle during use.

It will also be understood that removal of the central circular hub cap simulating cover member 20 which is preferably constructed from thin sheet metal, may be accomplished by the insertion of a pry-off tool between the radially outer extremity thereof and the adjacent portion of the outer surface of the central load bearing part 12, whereupon the bead 22 is distorted into an out of round condition to permit axial outward passage of the bead 22 over the respective humps 23.

From the foregoing it will be seen that there is provided herein a cover assembly for disposition over the outer side of a wheel structure, said cover assembly including a radially outer annular portion constructed from sheet synthetic plastic material or the like and having physical characteristics enabling it to be flexed locally, temporarily and whereby it will immediately snap back into initial configuration after the flexing pressures are relieved therefrom, said cover part being provided at the radially inner portion thereof with improved wheel engaging means including generally axially inwardly extending, circumferentially spaced lip portions formed integrally therewith, said lip portions being arranged to extend into openings in a wheel structure with which the cover is associated to concentrically align the cover therewith and to retain the same thereon against radial and circumferential slippage, there being resilient clip members on the wheel structure for bearing against the outer side of said lip portions to maintain the same in assembled relationship with the wheel. These lips also serve as a resilient cushion between the retaining members and the metallic wheel body. Furthermore there is provided herein a cover assembly having a radially outer part extending radially outwardly beyond the edge portion of the tire rim of a wheel structure with which it is associated to conceal the junction between the tire rim and a tire therein and having an intermediate portion of such a cross-section that it substantially simulates the side wall of a tire in the tire rim thereby to give the appearance of being a continuation thereof and a part thereof and to give the appearance of being a white side wall of the tire when colored white.

It will be understood that since the wheel cover embodying my invention is formed from synthetic plastic sheet material that it is of considerably less weight than the heretofore utilized metallic covers and thus greatly reduces the unsprung weight of a vehicle with which it is associated.

What I claim is:

1. In a wheel structure having a tire rim part and a central load bearing part, there being circumferentially spaced openings disposed around the junction between the wheel parts, a cover including a radially outer annular part constructed from synthetic plastic material having physical characteristics enabling it to be self-supporting as to form and yet resiliently flexible so that it snaps back to its initial position when flexing pressures are released therefrom, said cover having a cross-sectional expanse of a size to enable it to extend over the outer side of the tire rim to conceal the same and radially inwardly to the vicinity of the junction between the tire rim and the central load bearing part, retaining means on the wheel structure for engaging the radially inner part of said cover to detachably secure the same to the wheel structure, said cover having at the radially inner edge thereof a flange arranged for surface abutment with the adjacent portion of the outer surface of the wheel structure, said flange terminating in a plurality of generally axially inwardly extending lips circumferentialy spaced, and of such length that they are aligned with and fit snugly into the wheel openings to retain the cover over the wheel structure in concentric alignment therewith and against circumferential or radial slippage.

2. In a cover assembly for a wheel having a plurality of circumferentially arranged apertures, spring means disposed in said apertures, an annular cover member for disposition over the outer side of the wheel, said cover member being formed from resiliently flexible, plastic sheet material and having characteristics enabling it to be locally distorted yet whereby it will return to its initial configuration when distorting pressures are relieved therefrom and having integral, substantially axially inwardly extending lip parts at the inner margin thereof, said lip parts being disposed in respective apertures in the wheel to hold the cover against rotation relative to the wheel and also in hold-on relation to the spring clips, said clips engaging the lip parts to detachably maintain the cover against axial movement relative to the wheel and to anchor the respective inner portion of the cover during flexure of the adjacent outer portion thereof to render the rear side of the cover accessible.

3. In a cover assembly for a wheel having outer and central parts with spring means bearing toward the outer side of the central part thereof and having a plurality of circumferentially aligned apertures therein with which the spring means are aligned, a circular cover member for disposition over the outer side of the wheel, said cover member being formed from sheet synthetic plastic material and having characteristics enabling it to be locally distorted yet whereby it will return to its initial configuration when distorting pressures are relieved therefrom, and having at an inner part thereof, in substantial alignment with said apertures and said spring means, a plurality of lip parts extending substantially axially inwardly into respective apertures to maintain the cover member against rotative movement relative to the wheel, and into snap-on engagement with the spring means, said spring means engaging the respective lip parts to detachably maintain the inner part of the cover member against axial movement relative to the wheel.

4. In combination in a vehicle wheel structure of the character described, a tire rim, an inner load bearing structure supporting said rim, a circular cover member dimensioned to lie in concealing relation to said rim and extending radially inwardly into engagement with said load bearing structure adjacent to the juncture of the latter with the rim, and retaining clips mounted at said juncture and extending toward engagement with said load bearing structure, said cover member having portions thereof interposed separably between said retaining clips and said load bearing structure and being thus held between the clips and the respective contiguous portions of the load bearing structure.

5. A wheel structure of the character described including a tire rim of the drop center type and a central load bearing portion secured thereto, said rim and said load bearing portion having circumferentially spaced apertures along the junction thereof, resilient spring clips of the gooseneck type secured to the tire rim and being in alignment within the respective apertures, and a cover member including a radially outer annular portion formed from synthetic plastic sheet material characterized by local, resilient flexibility whereby to snap back into initial position upon release of flexing pull or pressure therefrom, said cover member having a plurality of integral, generally axially inwardly extending flanges at the radially inner part thereof, said flanges being arranged to extend into the respective apertures to bear radially against the load bearing portion of the wheel for alignment of the cover both radially and circumferentially relative to the wheel, said spring clips being arranged to engage said flanges and press the same detachably against said load bearing part.

GEORGE ALBERT LYON.

REFERENCES CITED

The following references are of record in the file of this patent:

UNITED STATES PATENTS

| Number | Name | Date |
|---|---|---|
| 1,234,337 | Pugh et al. | July 24, 1917 |
| 1,743,074 | Roth | Jan. 7, 1930 |
| 2,212,039 | Lyon | Aug. 20, 1940 |
| 2,279,331 | Lyon | Apr. 14, 1942 |
| 2,279,704 | Davenport | Apr. 14, 1942 |
| 2,333,626 | Aske | Nov. 9, 1943 |